Nov. 19, 1946.   C. S. GLASGOW ET AL   2,411,420
LANDING GEAR
Filed Dec. 24, 1942   4 Sheets-Sheet 2
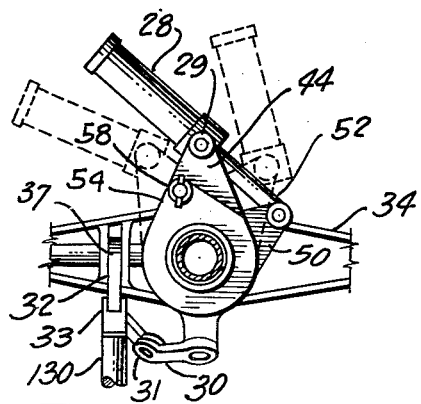
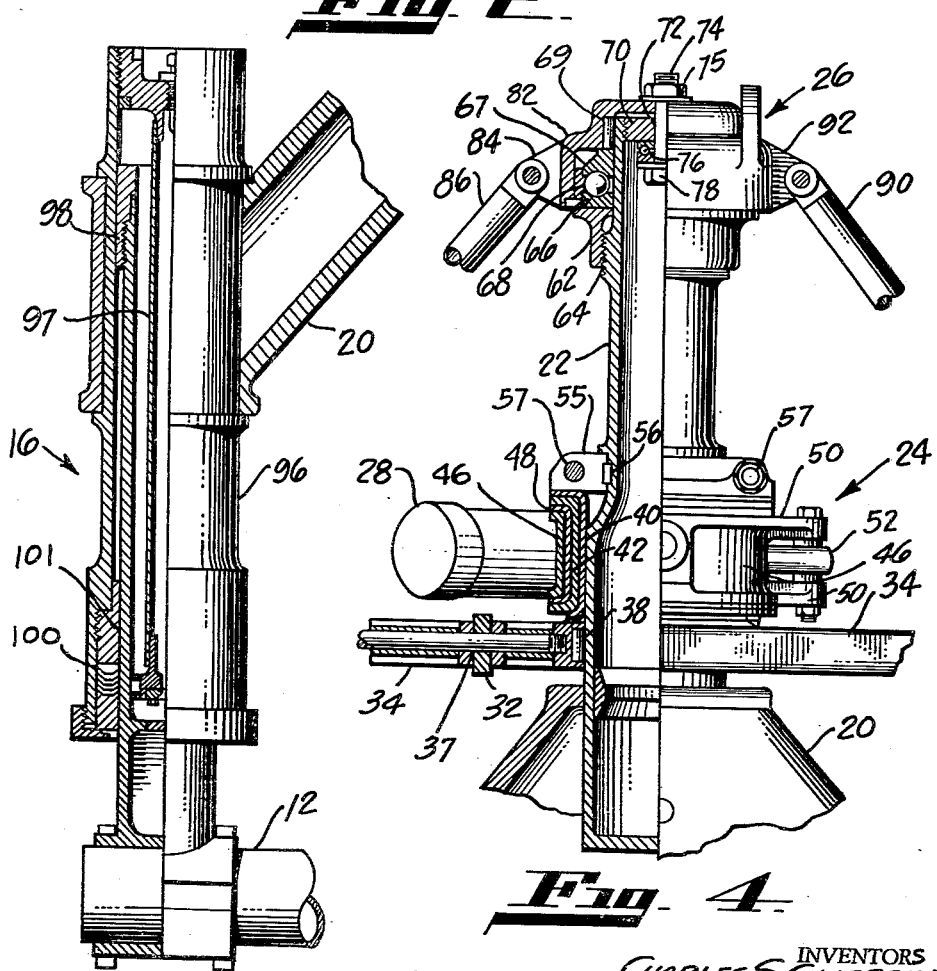
INVENTORS
CHARLES S. GLASGOW
CHARLES G. BROWN
BY
J. Edwin Coates
ATTORNEY

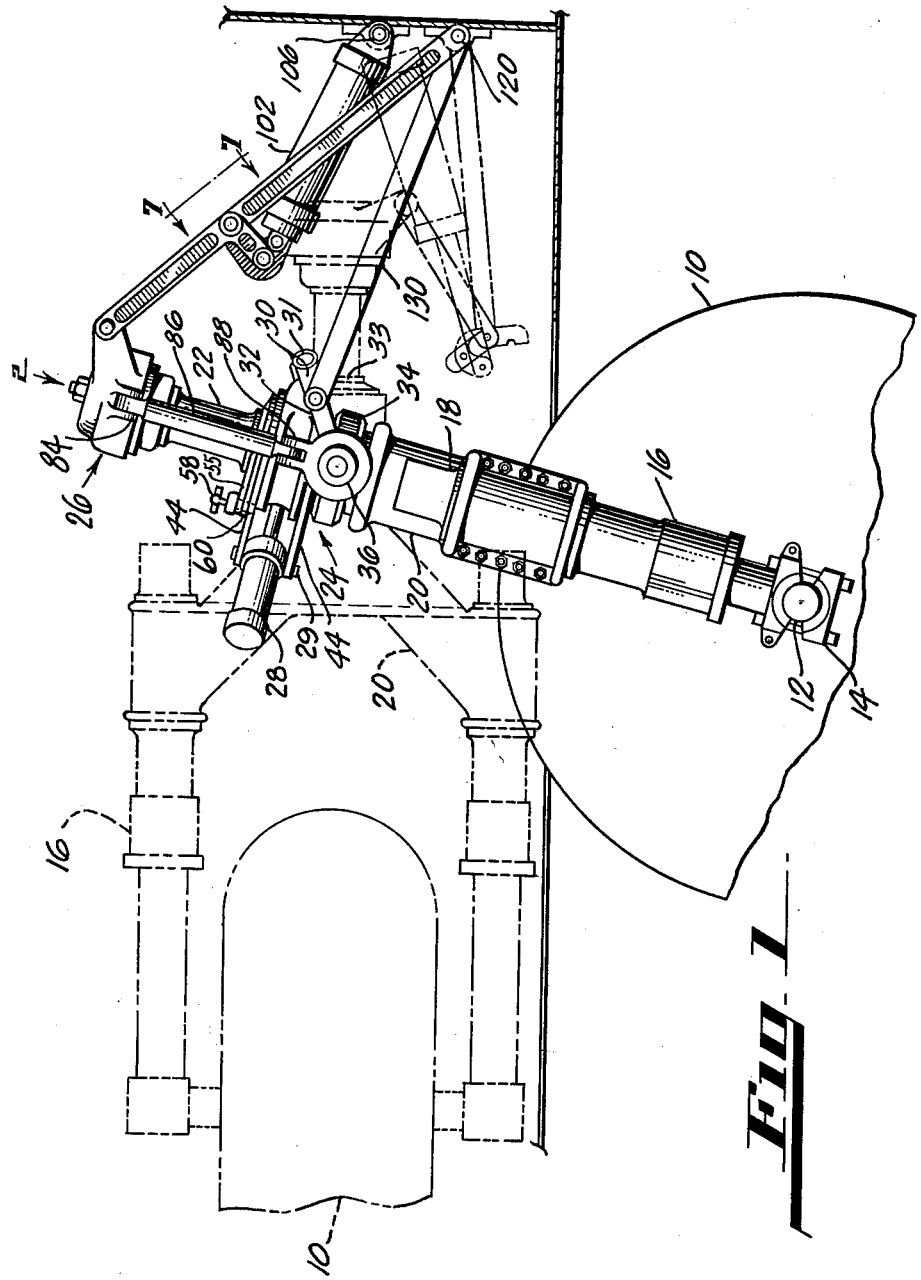

CHARLES S. GLASGOW
CHARLES G. BROWN
INVENTORS

BY J. Edwin Coates
ATTORNEY.

Nov. 19, 1946.     C. S. GLASGOW ET AL     2,411,420
LANDING GEAR
Filed Dec. 24, 1942     4 Sheets-Sheet 4

CHARLES S. GLASGOW
CHARLES G. BROWN
INVENTORS
BY J. Edwin Coates
ATTORNEY

Patented Nov. 19, 1946

2,411,420

UNITED STATES PATENT OFFICE 2,411,420

LANDING GEAR

Charles S. Glasgow, West Los Angeles, and Charles G. Brown, Santa Monica, Calif., assignors to Douglas Aircraft Company, Inc., Santa Monica, Calif.

Application December 24, 1942, Serial No. 470,320

11 Claims. (Cl. 244—102)

This invention relates to a retractable nose wheel landing gear for aircraft, and more particularly to a landing gear of the type having a single wheel mounted on an axle between a pair of shock absorber struts which form the arms of an inverted Y shaped structure, the central leg of which extends upwardly into the aircraft fuselage. The assembly is pivoted to the fuselage structure at a point substantially midway between the ends of the central leg so that the gear may be rotated about this point on both a transverse and longitudinal axis to place the nose wheel in a horizontal position in the bottom of the fuselage. In a landing gear of this invention, facilities are also provided for steering the nose wheel. These facilities, when conditioned for use, permit rotation of the gear on its longitudinal axis through 360 degrees, facilitating handling of the airplane by a ground crew.

While the gear of our invention is suitable for use on different types of aircraft, it finds particular utility on airplanes of the high wing type, i. e. those in which the wings are above the horizontal median plane of the fuselage. It is usually desirable to have the fuselage close to the ground for a number of reasons; for example, the loading of cargo and passengers is facilitated. In airplanes of the low wing and mid-wing types, i. e. airplanes, the wings of which are below or about level with the median horizontal plane of the fuselage, the spacing of the fuselage from the ground is determined by the diameter of the propellers in planes in which the engines are mounted in the wings.

In high wing airplanes, the diameter of the propellers has no bearing on fuselage ground clearance for the reason that the wing mounted engines are generally at a sufficient distance from the ground to afford ample propeller clearance independently of any fuselage ground clearance. It is possible then in high wing planes to place the fuselage as close to the ground as is compatible with shock absorption requirements.

In the heavier airplanes, the shock absorber struts are correspondingly longer to provide a long stroke, which may be decelerated with a smaller braking force. Accordingly in high wing airplanes, it is apparent that with any gear placed under the fuselage the length of the shock absorbing strut becomes a clearance determining factor unless the gear is so mounted as to place a considerable part of the upper portion of the strut within the interior of the fuselage.

It is not usually possible to so place the strut because the space, up into which a nose wheel strut would project, is already taken up by the pilots' compartment, instruments, piping and the like.

The location and dimensions of the space available for housing the landing gear wheel while retracted is also a consideration in designing the landing gear. Since the flooring in an aircraft is placed above the lower levels of the fuselage in order to gain width of floor, the resulting chamber below the floor becomes an ideal place to store the landing gear when retracted. However, this chamber is generally insufficient in height to accommodate the wheel if positioned vertically as it is positioned when in its landing position. It accordingly becomes an advantage to rotate the wheel assembly in retraction from a vertical to a near horizontal position so that the height of the space occupied may be small when the retraction is complete.

It is one object of our invention to provide a landing gear for aircraft which projects a relatively small distance below the fuselage when extended and occupies a shallow space in the fuselage when retracted.

It is an additional object of this invention to provide a simple, efficient, double-strut nose wheel landing gear for aircraft.

Another object of this invention is to provide a landing gear with relatively large shock absorbing capacity per unit of length.

Another object of the invention is to provide a landing gear which is housed in the fuselage when retracted at a relatively low level thereof, the main strut of the gear being pivoted to the fuselage structure at a point intermediate the ends of the strut for the accomplishment of this object.

Another object of the invention is to provide an efficient device for the automatic rotation of the gear on its longitudinal axis through an arc of substantially 90 degrees as the gear is extended or retracted in order to permit substantially horizontal disposition of the wheel when retracted.

A still further object of this invention is to provide a landing wheel gear which may be steered during taxiing by a control operated from the pilot's compartment.

Another object of this invention is to provide a full swivel release of the landing gear for rotation through 360° for use in the handling of the airplane by ground crews.

Another object of this invention is to provide a hydraulically operated means for locking the landing gear in its fully extended position.

Still another object is to provide a landing gear which will be of a light construction and occupy a relatively small space in the bottom of the interior of an airplane fuselage, making a correspondingly longer space available for mounting instruments, pipe lines, and other equipment.

Further objects and advantages of the invention will be brought out in the following description taken in connection with the accompanying drawings and appended claims.

Referring now to the drawings:

Figure 1 is a side elevational view of a landing gear showing it in the extended position in solid lines and in the retracted position in phantom lines.

Figure 2 is a fragmentary plan view of the landing gear showing the relative movements of the steering cylinder, rotating links and the full swivel release.

Figure 3 is a quarter sectional view of the shock absorbing cylinder showing the operating mechanism therein.

Figure 4 is a quarter sectional view of the central leg of the upper supporting structure of the landing gear showing the bearing members and steering mechanism.

Figure 5:
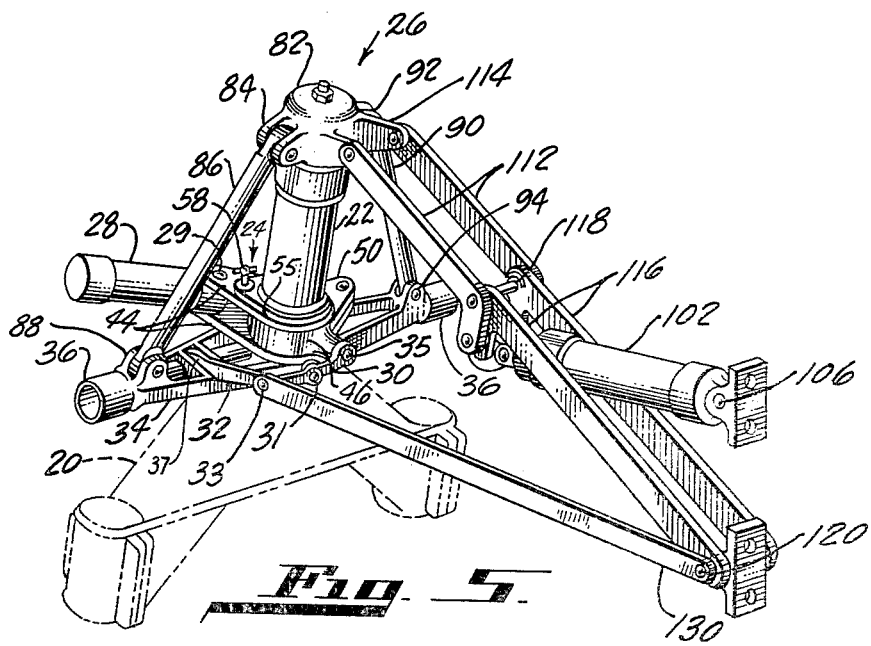
Figure 5 is a perspective view of the landing gear retracting and rotating mechanism as it appears when the gear is fully extended.

In detail and with reference to the accompanying drawings, Figure 1 shows a wheel 10 mounted for rotation on an axle 12 which is retained by fittings 14 attached to each end thereof, the fittings being carried by a pair of shock absorbing struts 16. The two struts are interconnected at their upper ends 18 by an inverted Y shaped member 20, the central leg 22 of which extends upwardly therefrom and is provided with a pair of collar and bearing assemblies 24 and 26.

Figure 6:
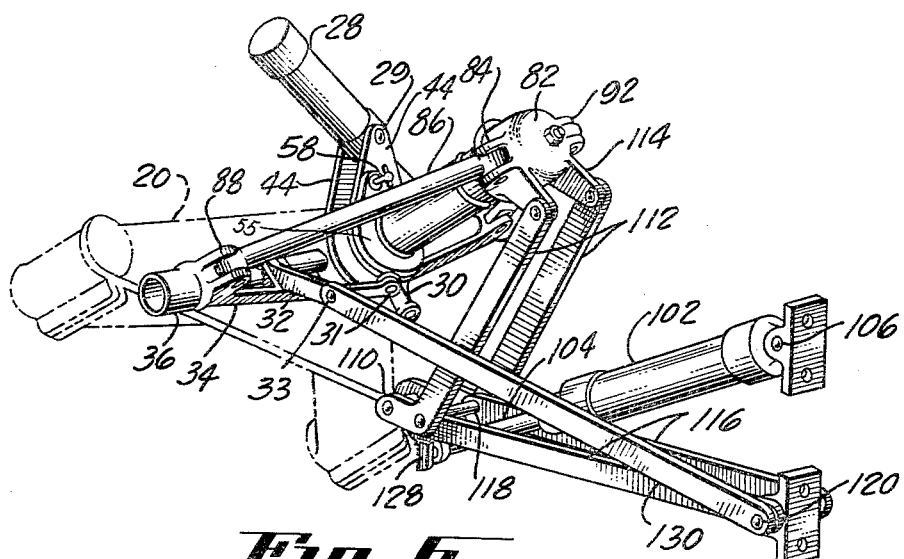
Figure 6 is a perspective view similar to Figure 5 but showing the retracting and rotating mechanism as it appears when the gear is in a partially retracted position.

As shown in Figures 4, 5 and 6, the lower collar and bearing assembly 24 is located just above the point at which the three legs of the Y-shaped member 20 are joined, and comprises a plurality of parts which are adapted to rotate with respect to each other in a manner to be described. This collar and bearing assembly serves to mount an hydraulic steering cylinder 28 and an eccentric link 30. The link 30 is pivotally connected at 31 to a link 32 which is held substantially stationary with respect to the airplane structure as will be later described, the arrangement being such that retraction and extension of the gear causes the wheel and shock strut assembly together with the Y-shaped member to rotate through an angle of nearly ninety degrees about the longitudinal axis of the leg 22.

A cross member 34 extends laterally from both sides of the leg 22 and is supported at each end by a bearing 36 fixed to the fuselage structure. A roller bearing 38 is placed between the member 34 and the leg 22 to assure freedom of relative rotation. The link 32 is pivoted at one end to the cross member 34 at 37.

Immediately above the cross member 34 a flanged bushing 40 is provided which encircles the leg 22. Between the flanges of this bushing a steering collar 42 is adapted to ride. This collar is provided with two bracket-like ears 44 which extend outwardly therefrom and provide a pivotal support for the hydraulic cylinder 28 at 29. Another collar 46 rides outside of the collar 42 and is separated therefrom by a bushing 48. This second collar likewise has two bracket-like ears 50 which extend outwardly therefrom to serve as a connection for the piston 52 of the hydraulic cylinder 28.

Rotation of the wheel assembly through 360 degrees is controlled by a releasable plunger type lock 58 carried by an extension 54 of a split collar 55. A key 56 prevents the collar from rotating with respect to the central leg 22 when the collar has been secured thereto by bolts 57. When the wheel assembly is in a straight fore and aft position, the plunger lock may be moved into a hole 60 placed in the upper ear 44 of the steering collar 42 just described.

The upper extremity of the central leg terminates in a collar and bearing assembly 26. A bearing cap supporting member 62 is threaded on the central leg 22 of the Y shaped member at 64 and supports a thrust ring 66 which serves as the lower race for ball bearings 68. The upper race for these bearings is in the form of another thrust ring 67 which also acts as a bottom retainer for a plurality of roller bearings 69 placed between the leg 22 and a cap 82. A plug 70 is threaded into the upper extremity of the central leg 22 to serve as a means to which the cap 82 may be secured to the leg, the plug being provided with a hole 72 and bolt 74 which is passed through the cap and secured by a nut 75. In order that free swiveling of the cap relative to the leg 22 may be assured, a ball thrust bearing 76 is placed between the head 78 of the bolt 74 and the plug 70.

From ears 84 and 92 on the retaining cap 82 a pair of links 86 and 90 extend downwardly and connect to lugs 88 and 94 formed integral with the cross member 34 at a point adjacent the bearings 36, thus forming a triangular bracing which rigidly secures the landing gear assembly against sideward motion with respect to the airplane.

Figure 3 shows a detail of the twin shock struts 16 used in this invention which are of the usual fluid and pneumatic type consisting of an exterior tube 96 and an interior tube 97 between which a piston 98 reciprocates, packings 100 and bearings 101 being installed to make an airtight assembly.

The twin shock struts joined by the Y member 20, divide the shock load and may therefore be substantially shorter than a single shock strut, correspondingly reducing the ground clearance of the fuselage.

For the purpose of extending or retracting the nose wheel a hydraulic cylinder 102 having a reciprocating piston rod 104 is provided. The closed end of the cylinder is pivoted to the airplane structure at 106 and the piston rod 104 on the opposite end of the cylinder 102 pivotally attaches to a locking link 108 at 105 as shown in Figure 7.

Certain portions of the locking mechanism, which will now be described, are shown in dash-dot lines in this figure and in Figure 8 for the sake of clarity.

The locking link is adapted to pivot at 109 about the pin 111 which is set between arms 110 extending outwardly from a pair of break links 112. The word "outwardly" is used to refer to that side of the links 112 and 116 which trail during the retractive movement of the links. The upper ends of the two upper break links 112 attach to a pair of lugs 114 formed as integral parts of the cap 82 on the upper collar and bearing assembly 26 while the lower ends of these links pivotally attach to a lower pair of break links 116 at 118 which are in turn pivoted to the airplane structure at 120.

Figure 7:
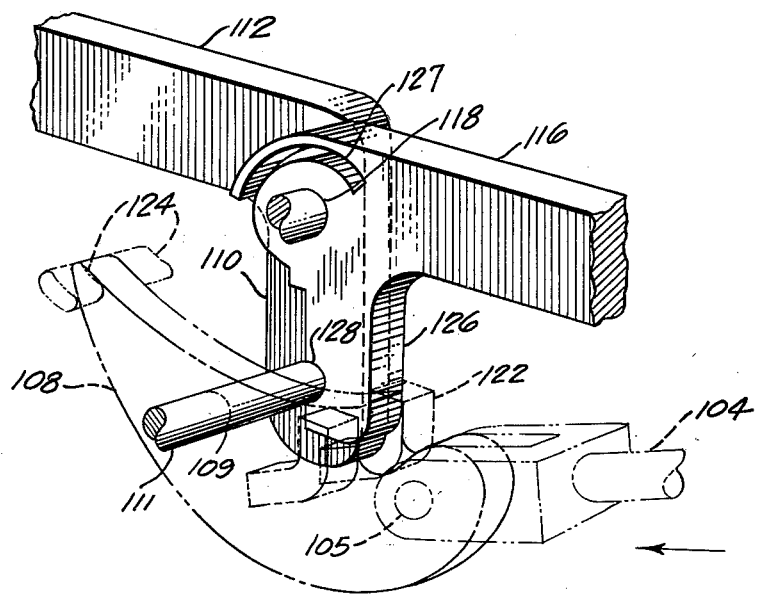
Figure 7 is an enlarged perspective view of the hydraulic locking mechanism in the position it assumes when the landing gear is fully extended and locked.
Figure 8:
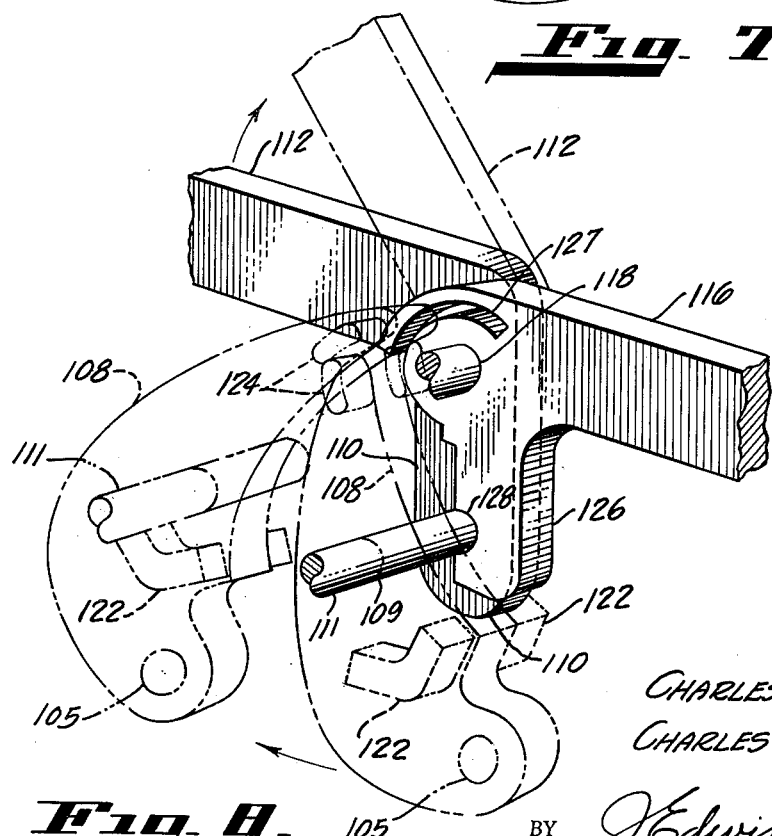
Figure 8 is an enlarged perspective view of the hydraulic locking device of Figure 7 as it appears in two different positions during the retracting travel of the landing gear.

As shown in Figures 7 and 8, the locking link 108 is provided with locking lugs 122 on either side of its lower end which are adapted to engage the lower ends of outwardly extending arms 126 of the break links 116. A pair of guide lugs 124 are provided on the front portion of the locking link in such a position that they will engage a semi-circular slot 127 provided adjacent and centering around the pivot shaft 118 connecting the lower and upper break links. The arm 126 of each lower break link 116 is provided with a notch 128 which is adapted to engage the pin 111 on the extension 110 of the corresponding upper break link.

An additional link 130 pivots at its one end to the airplane structure at 120 and at the opposite end it is pivoted at 33 to the link 32. The link 130 and pivot connection at 37 hold the link 32 substantially stationary with respect to the airplane structure with the result that relative movement of links 30 and 32 forces rotation of the wheel assembly during retraction and extension.

Assuming now that the landing gear is in the extended position as shown in Figures 1 and 5, the operation of retracting and again extending the gear will now be described.

As the piston of the hydraulic cylinder begins to extend, the first portion of its travel moves the locking link 108 in a clockwise direction from its position as shown in Figure 7. This first movement disengages the locking lugs 122 from their locking relation with the extension 126 of the lower break links 116 and moves the locking link into a position wherein the guide lugs 124 at the other end thereof begin to enter the semi-circular slot 127. As soon as the locking lugs 122 leave the extension 126, the upper and lower break links are free to turn inwardly about the pivot 118, the pivot 118 moving downward. Continued extension of the piston 104 causes the upper and lower break links to fold about themselves, and forces the lugs 124 to move to the inner end of the slot 127 at which point the retraction is completed and the retracting mechanism has moved into the position shown in phantom lines in Figure 1. The relative positions of the pivot shafts 105, 111 and 118, locking lugs 122 and guide lugs 124 is such as to give the piston rod 104 an effective leverage in locking and unlocking the links 112 and 116 and in folding and unfolding these links.

This movement of the break links pulls rearward and downward upon the top of the central leg 22, causing the leg and consequently the entire wheel assembly to rotate in a clockwise direction on the bearings 36, pulling the leg and wheel assembly upward into a substantially horizontal position.

While the wheel assembly is going through the retracting travel, it is also being rotated through an arc of nearly 90 degrees so that when the gear is fully up and inside the fuselage the wheel lies in a relatively horizontal plane. This rotation is accomplished by a moment applied by the links 30 and 32 to the leg 22 to turn the leg on its axis. The link 130 serves as a bracing link holding the eccentric link 32 substantially stationary with respect to the airplane structure while the rest of the gear assembly moves with respect thereto. As the wheel assembly pivots about the bearings 36, the collar 46 to which the eccentric link 30 is pivoted moves rearward and downward. However, since the pivot 31 between the links 30 and 32 is held substantially stationary, the eccentricity of the links forces the pivot between the link 30 and the collar to move in a clockwise direction. Consequently, the farther the central leg 22 of the wheel assembly moves toward the horizontal, the more the collar 46 rotates clockwise. Therefore, since the collar 46 is locked to the leg 22 through the hydraulic cylinder and the collar 42 which is in turn held with respect to the keyed collar 55 by the plunger lock 58, the entire wheel assembly moves clockwise through an arm of nearly 90 degrees.

When the landing gear is being used to steer the plane in taxiing, the eccentric links hold stationary the collar 46, ears 50 and pivot point attachment of the piston 52. The hydraulic steering cylinder 28, when actuated by the pilot, forces the leg 22, to which it is locked, to turn to the left or right as desired. The steering range is shown in Figure 2.

When full swiveling of the wheel assembly is desired, the plunger lock 58 is disengaged from the collar 42, whereupon free rotation of the leg 22 is had with respect to both collars 42 and 46.

In extending the gear, the action set forth above is reversed. As the piston begins to retract, the lugs 124 move out of the slot 127 in the lower break links and both pairs of break links return to the position shown in Figure 5. At the time the break links reach this position, the piston is not yet completely retracted. Consequently, completion of the retracting piston travel serves only to move the locking link up into locking position with respect to the break links as shown in Figure 7. When the break links and locking link are so positioned with respect to each other, the wheel assembly is securely held in the extended position.

While we have herein shown and described our invention in its present preferred embodiment, it will be obvious to those skilled in the art after studying the invention that various modifications and changes can be made therein without departing from the scope of the invention as defined by the appended claims.

We claim:

1. In a landing gear for an aircraft, the combination of: a main load strut carrying ground engaging means; a first means for mounting the strut on the aircraft structure in landing position and for rotation on its longitudinal axis; a first radial arm rotatable on said strut; a second means for securing said first arm to said mounting means for rotational immovability about its axis with reference to said mounting means; a second radial arm on said strut; a third means for rotationally immovably securing said second arm to said strut; and a link means connecting said arms and variable in length under the control of the pilot for imparting a relative angular movement to said arms.

2. The combination defined in claim 1 in which said third means is releasable at will to permit free rotation of said second radial arm about the axis of said strut.

3. The combination defined in claim 1 in which said link means is a hydraulic jack under the control of the pilot, the movable elements of which are connected to the radial arms respectively.

4. The combination defined in claim 1 in which said mounting means and strut are rotatable as a unit about an axis transverse to the longitudinal axis of the strut through an angle sufficient for retracting the strut to a non-landing position and in which said second means is arranged to cause a rotation of said first radial arm through an angle of substantially 90 degrees about its axis with reference to said mounting means, in consequence of and concomitantly with said retracting rotational movement, and in addition to said combination; power means under the control of the pilot for rotating said mounting means and strut through said retracting angle.

5. In a landing gear for an aircraft, the combination of: a main landing strut carrying ground engaging means; a structure for mounting the strut on the aircraft structure for rotation on its longitudinal axis and for reversibly swinging it through a limited angle on an axis transversely intersecting its longitudinal axis between an upright landing position and a relatively horizontal retracted position; means under the control of the pilot for thus swinging the strut; a radial arm secured to said strut projecting from the strut in a direction transverse to the direction of said transverse axis at a station along said strut adjacent said transverse axis; linkage pivotally connected at one end to said arm on the longitudinal axis of the arm and pivoted at the other end on said transverse swinging axis to one of said structures at a station substantially displaced from the longitudinal axis of the strut, said linkage comprising an inner link connected to said arm and an outer link pivotally connected to said inner link, said links forming a generally arcuate tie between its terminal pivots when said strut is in its landing position; and a relatively long link pivotally connected at one end to the aircraft structure at a station approximately at a level of said transverse axis and at the other end to said outer link at an intermediate station therealong whereby said long link is disposed substantially perpendicular to the direction of said transverse axis and substantially longitudinally aligned with the outer portion of said outer link.

6. In a landing gear, the combination of: a pair of shock absorbing struts; a wheel mounted for rotation therebetween; means joining the upper ends of said shock absorbing struts and extending upward therebeyond in a single leg non-rotatably related to said struts; means supporting said leg for relative rotation on its longitudinal axis and on an axis transverse thereto; means eccentric of said longitudinal axis interconnecting said leg and supporting means and adapted to rotate said leg on its longitudinal axis over a limited angular travel substantially simultaneously with a corresponding limited rotation of said leg about said transverse axis; and means attached to said leg above said supporting means for rotating said leg about said transverse axis.

7. In a landing gear, the combination of: a pair of shock absorbing struts; a wheel mounted for rotation therebetween; means joining the upper ends of said shock absorbing struts and extending upward therebeyond in a single leg non-rotatably related to said struts; means supporting said leg for relative rotation on its longitudinal axis and on an axis transverse thereto; means eccentric of said longitudinal axis interconnecting said leg and supporting means and adapted to rotate said leg on its longitudinal axis over a limited angular travel responsive to rotational movement of said leg over a corresponding limited travel on said transverse axis; and means attached to said leg above said supporting means for rotating said leg about said transverse axis.

8. In a landing gear, the combination of: a pair of shock absorbing struts; a wheel mounted for rotation therebetween; means joining the upper ends of said shock absorbing struts and extending upward therebeyond in a single leg; means for supporting said leg for rotation on its longitudinal axis and on an axis transverse to the longitudinal axis; a collar assembly surrounding said leg and having annular parts rotatively movable relative to each other, certain of said parts being releasably attached to said leg and certain other of said parts being connected with said leg supporting means; means between said relatively movable parts for causing relative rotation thereof whereby said leg is rotated on its longitudinal axis relative to its supporting means; and means attached to said leg at a station longitudinally displaced from said supporting means for rotating said leg about said supporting means on an axis transverse to the longitudinal axis of said leg.

9. In a landing gear, the combination of: a pair of shock absorbing struts; a wheel mounted for rotation therebetween; means joining the upper ends of said shock absorbing struts and extending upward therebeyond in a single leg; means for supporting said leg; a collar assembly surrounding said leg and having parts movable relative to each other, certain of said parts being releasably attached to said leg; a plurality of means eccentric of said longitudinal axis connecting certain other of said collar assembly parts to said leg supporting means; changeable length means interconnecting said relatively movable collar assembly parts and adapted to rotate said leg to left or right on its longitudinal axis for steering of said wheel; and means attached to said leg at a station longitudinally displaced from said supporting means for rotating said leg about an axis through said leg supporting means and transverse to the longitudinal axis of said leg, said last mentioned rotational movement forcing said eccentric means to move with respect to each other and rotate said leg on its longitudinal axis in an angular direction corresponding to the angular direction of said rotational movement.

10. In a landing gear, the combination of: a pair of shock absorbing struts; a ground engaging means mounted therebetween; means joining said shock absorbing struts and extending upward as a single leg; means for axially rotatively supporting said leg on the aircraft structure, said last named means having parts movable relative to each other, certain of said parts being rotatively releasably attached to said leg and certain other of said parts being attached to the remainder of said leg supporting means and held thereby against rotation with said leg; means interconnecting said parts for moving them relative to each other in steering the ground engaging means; and means connected to said leg above said supporting means for rotating said leg about said supporting means on an axis transverse the longitudinal axis of said leg.

11. In an aircraft landing gear, the combination of: first and second articulated break links longitudinally aligned in the gear extended position and foldable in the gear retracted position; first and second arms rigidly connected to said links respectively and extending outwardly therefrom; means preventing outward articulation of said brake links; a locking link pivoted to the first arm; engaging locking surface means on said link and second arm; cylindric surface means associated with said articulated links and concentric with the axis of articulation; stop means on said locking link for engagement with said cylindric surface to limit movement of said locking link in a direction to disengage said locking surfaces; a power rod pivoted to said link on an axis more remote from said pivot axis of said link than said locking surfaces and disposed outwardly from said pivot axis of said link for first rotating said link on its pivot axis to disengage said locking surfaces, then moving said stop against said cylindric surface and thereafter relatively rotating said locking link and first break link about the articulating pivot axis; and means preventing pivotal movement of said locking link with respect to said first break link when said first and second break links are in other than extended position, all of the pivot axes being perpendicular to the plane of articulation of said break links.

CHARLES S. GLASGOW.
CHARLES G. BROWN.